United States Patent
Bowe

(10) Patent No.: US 11,357,174 B2
(45) Date of Patent: Jun. 14, 2022

(54) SEED STARTING TRAY

(71) Applicant: W. ATLEE BURPEE COMPANY, Warminster, PA (US)

(72) Inventor: Graham Bowe, Warminster, PA (US)

(73) Assignee: W. ATLEE BURPE COMPANY, Warminster, PA (US)

( * ) Notice: Subject to any disclaimer, the term of this patent is extended or adjusted under 35 U.S.C. 154(b) by 88 days.

(21) Appl. No.: 16/862,736

(22) Filed: Apr. 30, 2020

(65) Prior Publication Data

US 2020/0344959 A1 Nov. 5, 2020

Related U.S. Application Data

(60) Provisional application No. 62/840,521, filed on Apr. 30, 2019.

(51) Int. Cl.
*A01G 9/029* (2018.01)

(52) U.S. Cl.
CPC ......... *A01G 9/0295* (2018.02); *A01G 9/0293* (2018.02)

(58) Field of Classification Search
CPC .......... A01G 9/02; A01G 9/027; A01G 9/028; A01G 9/029; A01G 9/0293; A01G 9/0295; B65D 25/38; B65D 83/00; B65D 83/0005; B65D 83/0022; B65D 83/0072
See application file for complete search history.

(56) References Cited

U.S. PATENT DOCUMENTS

| | | | | |
|---|---|---|---|---|
| 2,053,711 A | * | 9/1936 | Glomb | A23G 9/221 249/120 |
| 3,483,908 A | * | 12/1969 | Donovan | B65D 1/40 221/260 |
| 4,457,104 A | * | 7/1984 | Hefner | A01G 9/029 47/73 |
| 5,930,951 A | * | 8/1999 | Wong | A01G 9/02 47/66.1 |
| 6,793,193 B2 | * | 9/2004 | de Groote | A47J 43/20 249/119 |
| 10,696,432 B2 | * | 6/2020 | Levy | A47G 19/00 |

(Continued)

FOREIGN PATENT DOCUMENTS

| | | |
|---|---|---|
| DE | 202020001227 U1 | 8/2020 |
| GB | 2307391 A | 5/1997 |

(Continued)

OTHER PUBLICATIONS

GB 2104227.0, Search report dated Sep. 17, 2021, 3 pages—English.

(Continued)

*Primary Examiner* — Kristen C Hayes
(74) *Attorney, Agent, or Firm* — Andrew F. Young; Nolte Lackenbach Siegel

(57) ABSTRACT

A seed starting tray including at least one cell defining a space, the at least one cell including a rigid upper portion defining an opening of the least one cell, and a flexible lower portion defining a base of the at least one cell, the flexible lower portion being transitionable between a first position in which the space defines a first volume and a first height and a second position in which the space defines a second volume and a second height, the first volume being greater than the second volume and the first height being greater than the second height.

3 Claims, 6 Drawing Sheets

(56) References Cited

U.S. PATENT DOCUMENTS

| | | | |
|---|---|---|---|
| 10,750,688 B2 * | 8/2020 | Arnau | ................. A01G 9/02 |
| 10,750,888 B2 | 8/2020 | Watson | |
| 2008/0271371 A1 | 11/2008 | Weder | |
| 2018/0132437 A1 * | 5/2018 | Arnau | ................. A01G 31/02 |

FOREIGN PATENT DOCUMENTS

| | | |
|---|---|---|
| JP | 2013070697 A | 4/2013 |
| KR | 20180129515 A | 12/2005 |

OTHER PUBLICATIONS

U.S. Appl. No. 16/862,736, Office Action dated Oct. 15, 2021, 8 pages.

* cited by examiner

SEED STARTING TRAY

CROSS REFERENCE TO RELATED APPLICATIONS

This application relates to, and claims priority from, U.S. Prov. Pat. No. 62/840,521, filed on Apr. 30, 2019, the entire contents of which are incorporated herein by reference.

BACKGROUND OF THE INVENTION

Field of the Invention

The present invention generally relates to a tray including multiple cells or compartments, and more particularly to a seed starting tray.

Description of the Related Art

Plug plants ("plugs") in horticulture are small-sized seedlings grown in seed starting trays that include small individual cells that are typically filled with a peat or soil substrate. Typically, plugs are small rooted cuttings or seedlings grown in cell trays containing soil. They are relatively inexpensive and allow a space to be vegetated with a known mix of plants in a desired density and arrangement.

After growing the plugs in the trays, the plugs are transplanted into containers or into a garden. The trays are typically formed from a thin, rigid material that is prone to being damaged or broken, especially when attempting to remove the plug from the tray. As the trays are formed from a rigid material that is prone to cracking or breaking, during removal of the plugs, the trays are often damaged and as such cannot be reused. In addition, the plug may be damaged when trying to scoop the plug out from the cell within the tray. Thus, conventional trays are disadvantageous because they tend to be damage-prone and single-use and the plugs may be damaged during removal of the plugs from the cells of the tray.

Accordingly, there exists a continuing need for new and improved trays for growing plug plants that are less prone to be damaged and easier to clean and thus suitable for being re-used and that facilitate easier removal of plugs from the cells of the tray in which they had been grown. The present disclosure addresses the problems of the conventional trays.

It should be understood that the foregoing description is provided to aid in understanding the present disclosure and should not be construed as any admission of prior art without an explicit statement to that effect.

ASPECTS AND SUMMARY OF THE INVENTION

In an embodiment, a seed starting tray may include: a plurality of cells arranged in columns and rows and defining a shape having a perimeter; a rigid portion forming an upper portion of each cell, the rigid portion defining an opening of each cell; a flexible portion forming a lower portion of each cell, the flexible portion defining a base of cell, the flexible portion being deformable in a direction toward the opening; and a pair of opposing handles, each handle being disposed at opposing sides of the perimeter.

In an embodiment, a seed starting tray may include at least one cell defining a space. The at least one cell may include a rigid upper portion defining an opening of the at least one cell and a flexible lower portion defining base of the at least one cell. The flexible lower portion being transitionable between a first position in which the space defines a first volume and a first height and a second position in which the space defines a second volume and a second height, the first volume being greater than the second volume and the first height being greater than the second height. The at least one cell may include a plurality of cells, which may be arranged in columns and rows. The at least one cell may define a rectangular shape. The lower portion may include at least one drainage opening.

The flexible lower portion may be deformable and pushable in a direction toward the opening of the at least one cell when a force is applied upon the flexible lower portion in a direction toward the opening of the at least one cell such that the flexible lower portion transitions toward the second position. The flexible lower portion may be biased toward the first position.

The flexible lower portion may include a hinged section that borders the rigid upper portion and a base section. The flexible lower portion may be transitionable between an unfolded state and a folded state, wherein when in the unfolded state, the flexible lower portion is in the first position and in the folded state, the flexible lower portion is disposed at least partially in the rigid upper portion and the flexible lower portion is in the second position. The hinged section may be a living hinge that is configured to facilitate transitioning of the lower portion between the folded state and the unfolded state.

A handle or a pair of handles may be secured to the perimeter of the rigid upper portion of the tray such that the tray may be moved without disturbing the lower flexible portion of the tray. For example, the at least one cell may define an upper perimeter, and a pair of opposing handles may be coupled to opposing sides of the upper perimeter.

These and other aspects of the present disclosure are more fully described herein with reference to the accompanying figures.

DETAILED DESCRIPTION OF THE PREFERRED EMBODIMENTS

Figure 1:
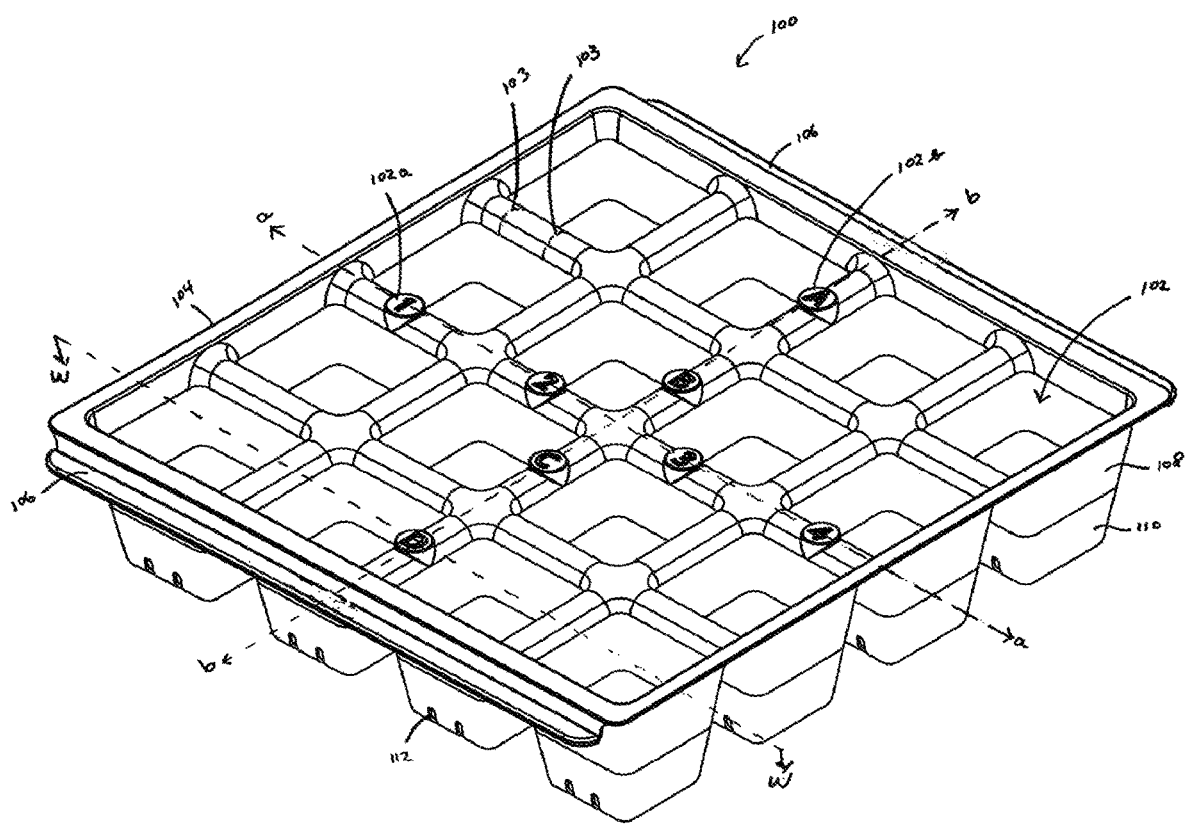
FIG. 1 is a perspective view of a seed starting tray in accordance with the present disclosure shown in a first condition.

Reference will now be made in detail to embodiments of the invention. Wherever possible, same or similar reference numerals are used in the drawings and the description to refer to the same or like parts or steps. The drawings are in simplified form and are not to precise scale.

A seed starting tray 100 in accordance with the present disclosure is described with reference to FIGS. 1-4B.

As shown in FIG. 1, the seed starting tray 100 may include a plurality of cells or compartments 102 that may be arranged in columns and rows. The seed starting tray 100 may have any suitable shape and configuration. Each of the cells or compartments 102 may define a square or rectangular upper perimeter. The plurality of cells or compartments 102 may be positioned adjacent to one another. Each of the cells or compartments 102 may taper from its opening toward its base such that each of the cells or compartments 102 has a generally truncated rectangular or square pyramid prism or tapered rectangular or square plantar shape. For example, each cell 102 may have a square frustum shape in which its base has a square shape having a smaller dimension than a square opening of the cell 102.

Figure 2:
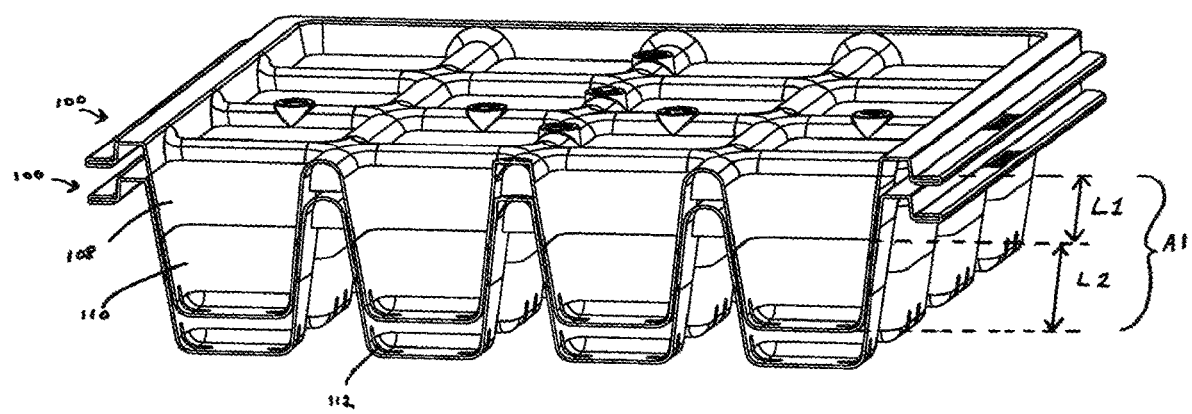
FIG. 2 is a perspective partial cut-away view, taken along section line W-W of FIG. 1, illustrating a first seed starting tray of FIG. 1 and a second seed starting tray of FIG. 1 shown stacked one atop the other.
Figure 3A:
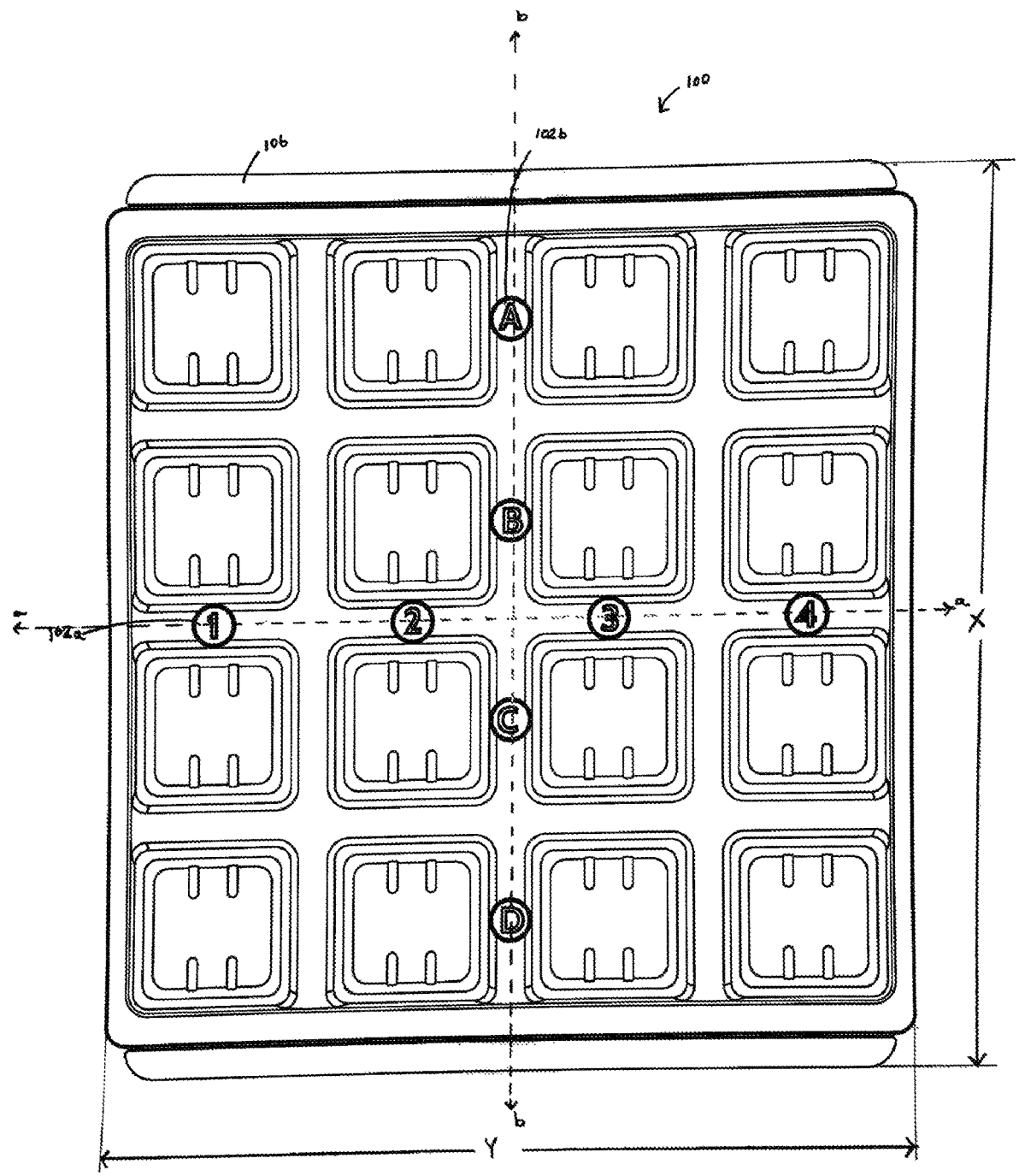
FIG. 3A is a top view of the seed starting tray of FIG. 1.
Figure 3B:
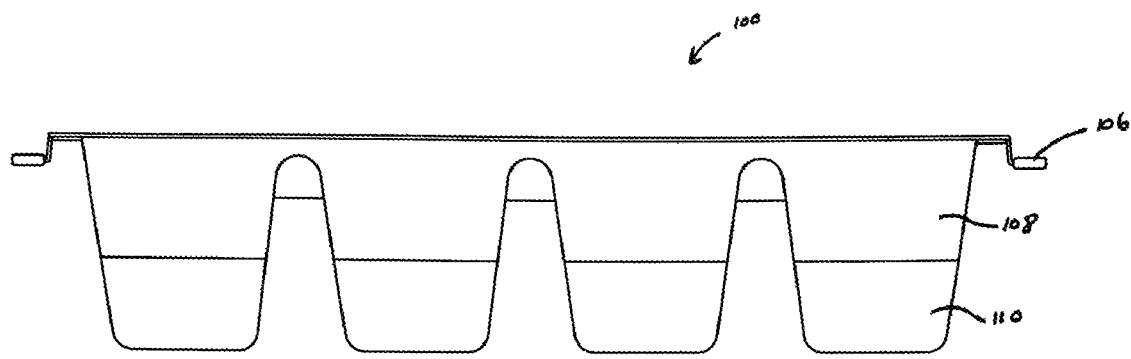
FIG. 3B is a first side view of the seed starting tray of FIG. 1.
Figure 3C:
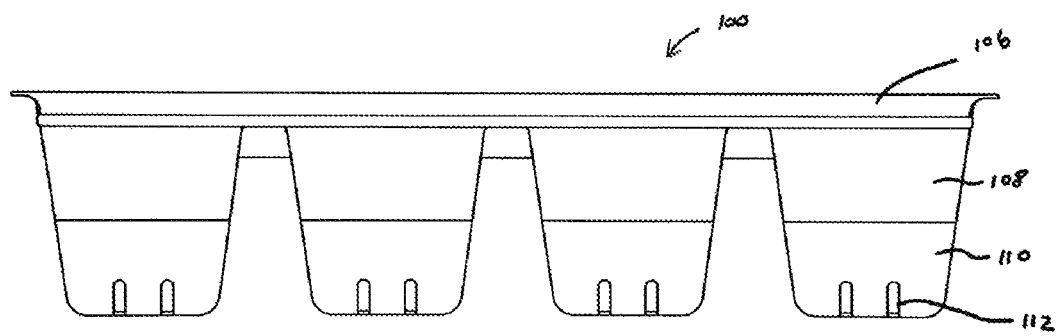
FIG. 3C is a second side view of the seed starting tray of FIG. 1.

As shown in FIG. 2, the tapered shape of the cells 102 may facilitate stacking of two or more of the seed starting trays 100 one atop the other with the base of each of the cells or compartments 102 of one tray disposed in the cells or compartments 102 of another of the seed starting trays 100. As shown in FIG. 3A, the cells 102 may be arranged along a horizontal axis a and a vertical axis b. It should be understood that although the top of the tray 100 is shown as having a rectangular shape having a width X and a length Y, that the tray 100 may define a different shape including, for example, a round or cylindrical shape.

The cells 102 may be arranged in rows and columns. At an interval or at each of the cells 102 along the horizontal axis a, a column identifier 102a, which may be a letter (A, B, C, . . . ) or a number (1, 2, 3, . . . ) may be printed. Similarly, at an interval or at each of the cells 102 along the vertical axis b, a row identifier 102b which may be a letter or a number may be printed. Accordingly, a cell in column B, row 3 may be identified as cell B3, and so on. Ribs 103 disposed between the walls forming the cells 102 may provide structural rigidity and support to the tray 100. It should be understood that when the tray 100 is configured to have a different shape, e.g., a round or cylindrical shape, that another system of marking individual cells other than marking rows and columns may be denoted. Each individual cell 102 may also be marked with an identifier so as to easily identify the contents contained therein.

The tray 100 may have a rectangular or square shape. Handles 106 may be disposed at opposing sides along a perimeter 104 of the tray 100 to facilitate moving or handling the tray 100 without having to touch any of the individual cells 102. Preferably the handles 106 are disposed at only two opposing sides as opposed to along the entire perimeter 104 such that two or more trays 100 may be placed alongside one another with minimal spacing between adjacent ones of the trays 100.

Each of the cells or compartments 102 may have a rigid portion 108 having a first height L1 and a flexible portion 110 having a second height L2, the total height or depth of the cell or compartment 102 being the sum of the first height L1 and the second height L2. The heights L1 and L2 may be the same or different.

The rigid portion 108 may extend from the opening to the cell 102 to a depth within the frustum shape of the cell 102 and the remainder of the frustum shape of the cell that forms the base of the cell 102 may be formed from a flexible material. The rigid portion 108 may be formed from a thermoformed plastic or polymer. The flexible portion 110 may be formed from a soft silicone material.

This is advantageous because the upper, rigid portion 108 of the tray 100 may be handled without disturbing the seedlings or plugs which may be disposed within the cell 102 while the flexible portion 110 may be manipulated (e.g., pushed in a direction toward the opening of the cell 102) to cause the ejection of the seedling or plug out from the cell 102. Deformation of the flexible portion 110 may require application of a force or pressure thereupon greater than a predetermined amount such that when resting upon a surface (e.g., a table), the cell 102 may be in an undeformed state, however, when force of a sufficient amount is applied to the exterior of the flexible portion 110 of the cell, the flexible portion 110 may be deformed such that its contents (e.g., the plug) may be pushed out from the cell 102. Each of the cells 102 may include one or more drainage openings 112 which may extend along lateral surface(s) of the cells 102 such that the drainage opening(s) 112 are not obstructed or sealed when the tray 100 is placed atop a surface (e.g., a table).

It should be understood that while in a preferred embodiment that the lower portion 110 is flexible, embodiments in which the lower portion is formed from other materials may be within the scope and spirit of the present disclosure. For example, in an embodiment, the lower portion may be movable relative to the upper portion, e.g., the lower portion may be telescopic with respect to the upper portion such that the lower portion 110 may be moved up in a direction toward the opening of the cell such that when the lower portion enters into the interior space of the upper portion, contents contained within the cell may be ejected therefrom. Preferably, however, the lower portion 110 is formed of a flexible material, whereas the upper portion is formed of a rigid material. For example, the lower portion 110 may be formed of a flexible silicone or rubber-like material or the like, whereas the rigid portion 108 is formed of a rigid material such as a polymer or plastic, such as, for example, a high density polyethylene (HDPE) which is a hard rigid plastic. While a variety of materials may be used to form the flexible material of the lower portion 110, preferably a material that is biased toward an undeformed shape and when forces cease to be applied to the lower portion 110, the lower portion 110 returns back to its initial form or configuration. For example, a silicone or rubber like material is capable of being deformed temporary during the application of a force and would transition back toward its original form when the force is no longer applied. The lower portion 110 may be coupled or bonded to the upper portion 108 in a variety of ways.

Key benefits of the presently disclosed tray 100 which includes cells having an upper rigid portion 108 and a lower flexible portion 110 include: (a) reusability as the tray is less prone to break when pressure is applied to the cells to remove plugs; (b) easer cleaning; (c) easy handling due to a rigid portion that may be handled even though a portion of the tray is rigid to facilitate easier handling; (d) less damage to the plugs as the flexible portions of the cells make removing root balls for transplanting easier; (e) Molded design allows for more precise perforations for better water drainage; (f) Soft rubberized texture of silicone, which may comprise the lower flexible portion makes seed trays more slip resistant; and (g) the two part (upper portion 108 and lower portion 110) may also facilitate construction is two color forms.

When not used, as shown in FIG. 2, the trays 100 may be stacked one atop the other, which may be facilitated by the frustum or tapered shape of the cells 102 such that cells 102 of an upper tray 100 may be inserted or disposed within a lower tray 100 and so forth, thereby permitting the stacking of the trays 100.

The molded rigid plastic material forming the rigid portion 108 may provide structural rigidity to the tray for easier handling than current products. The soft silicone material which may form the flexible portion 110 may make it easier to extract seedlings from the cell when they are ready for transplanting. For example, the height L2 of the flexible portion 110 may be sufficient such that pushing of the flexible portion up in the direction of the opening of the cell or compartment 102 effects ejecting of the contents of the cell or compartment 102. The rigid plastic and silicone are also easier to clean than most common thermoformed trays. The molding process also allows for more precise contouring and perforation for easier use and improved water drainage performance. The molded plastic and silicone seed starting tray is also much easier to clean and more durable than thermoformed plastic seed starting trays that are the industry standard today.

Figure 3D:
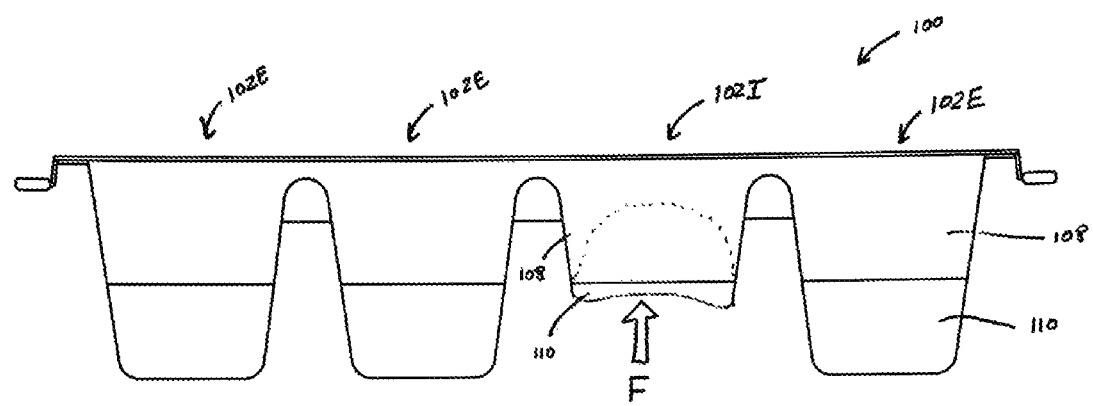
FIG. 3D is the first side view of the seed starting tray of FIG. 3B shown with a force being applied to one of the cells of the tray.

As shown best in FIG. 3D, the tray 100 is shown from a side in which four cells 102 are visible from the side view showing three expanded cells 102E and one inverted cell 102I in which a force F was applied to the flexible portion 110 to push the flexible portion 110 in a direction toward the opening of the cell and into the rigid portion 108 such that contents that might have been contained within the cell would be ejected therefrom or more easily removed therefrom.

Figure 4A:
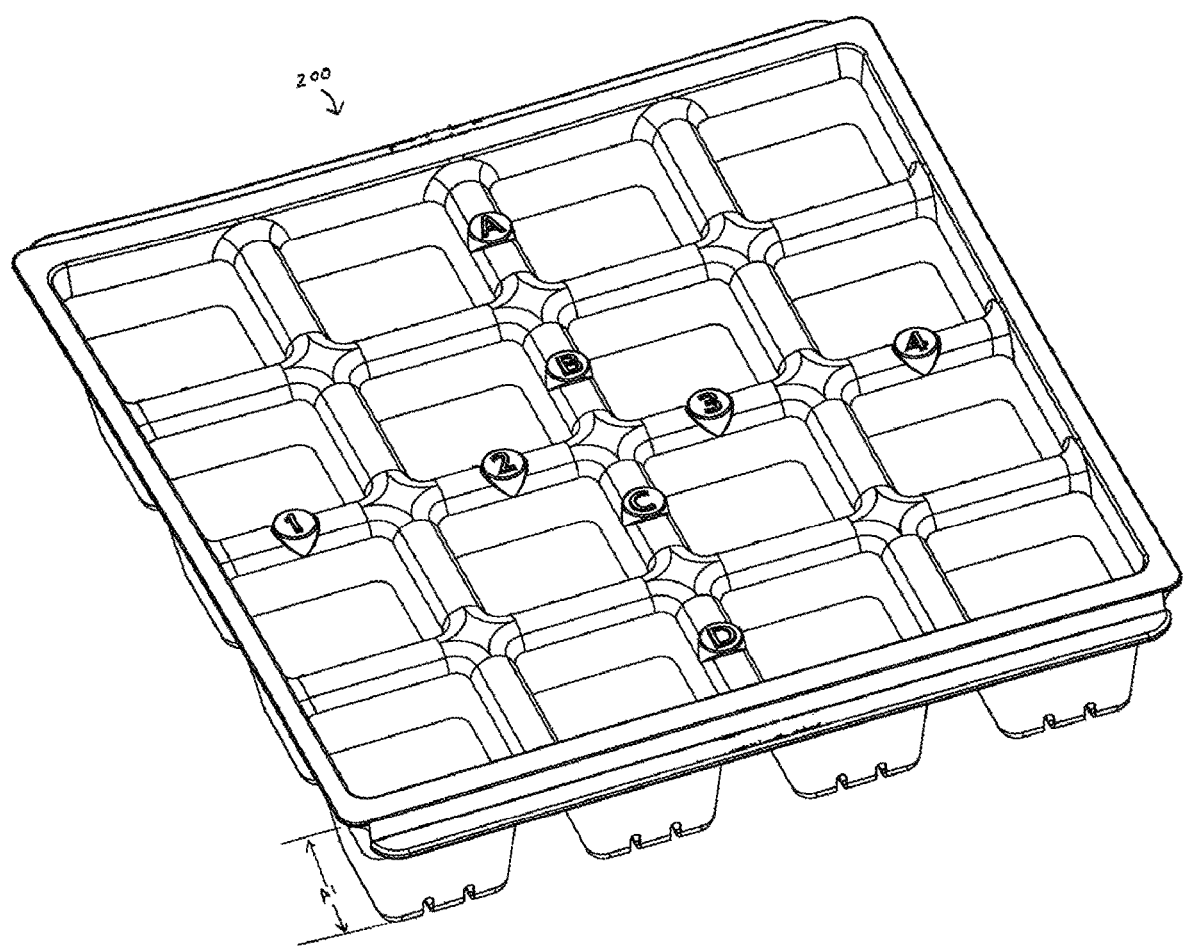
FIG. 4A is a perspective view of another seed starting tray shown in an expanded condition. in accordance with the present disclosure.
Figure 4B:
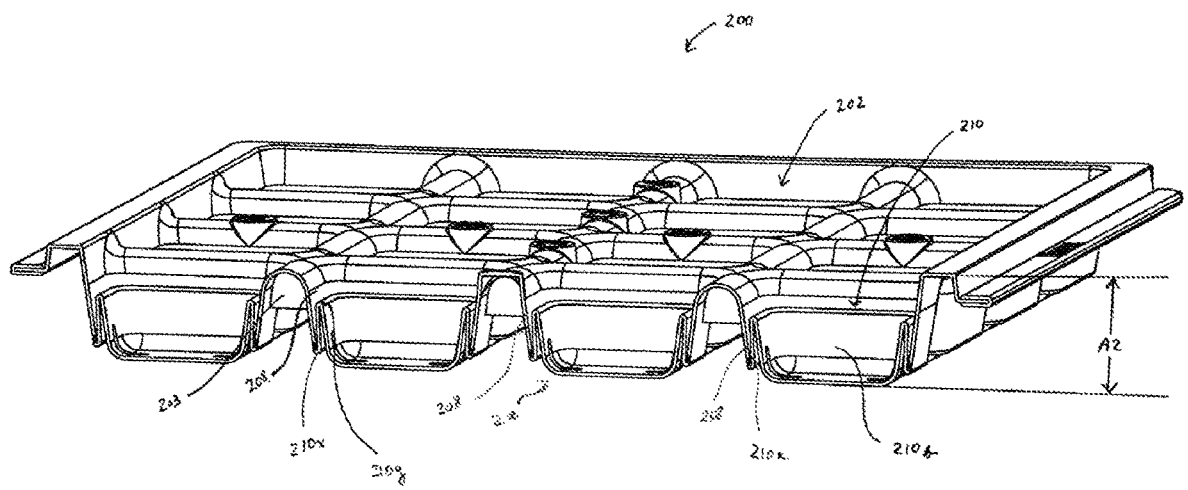
FIG. 4B is a perspective view of the cell of FIG. 4A shown in a collapsed condition.

In an embodiment as shown in FIGS. 4A-4B, although, a seed starting tray 200 may be substantially similar to the previously described seed starting tray 100. The seed starting tray 200 may be compressed into a smaller form factor since each cell 202 includes a flexible, deformable region 210, that is collapsible into a small form factor. thereby permitting the trays 100 to be collapsed with respect to the height dimension during storage of the trays 200. The cells 102 of the tray 200 may be configured to transition between an unfolded state and a folded state and to remain in one of those states unless acted upon by the user to transition the tray 200 to one of the folded state (i.e., storage state) or unfolded (i.e., ready-to-use state).

That is, the tray 200 may be stable in each of the folded and unfolded states but may not be biased toward either state. Foldlines or creases 210x, 210y that may be formed within the flexible portion 210 may create a living hinge to determine how the flexible portion 210 is folded. The flexible portion 210 may be formed from a polymer or a silicone or rubberlike material. For example, by applying a pressure to the flexible portion 210 toward the opening of the cell 202, the flexible portion 210 may fold at each foldline such that the flexible portion 210 collapses and compresses down to a smaller height as a hinged section 210a of the flexible portion 210 folds with respect to a base section of the flexible portion 210 such that the height of the cell 202 becomes smaller such that the cell 202 transitions from the expanded height A1, which includes the height L1 of the rigid portion 208 and the height L2 of the rigid portion 210, to the collapsed height A2. The One or more foldlines or creases 210x, 210y may be disposed around the perimeter of the flexible portion 210 at one or more positions relative to the height of the flexible portion 210 and may be oriented parallel to one another when there is a plurality of foldlines defining living hinges in the flexible portion 210.

GLOSSARY OF REFERENCE CHARACTERS

100: Seed starting tray
102: Cells or compartments
102a: column identifier
102b: row identifier
102C: Inverted cell
102E: Expanded cell
F: force
a: Horizontal axis
b: Vertical axis
X: width
Y: length
103: Rib
104: Perimeter
108: Rigid portion
110: Flexible portion
112: Drainage opening
200: Seed starting tray
202: Cells or compartments
203: Rib
208: Rigid portion
210: Flexible portion Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A seed starting tray, comprising:
a plurality of cells defining a plurality of columns and rows;
said plurality of cells having a rigid upper perimeter;
a pair of opposing handles, each of the handles of the pair of opposing handles being coupled to opposing sides of the rigid upper perimeter;
each of said cells defining a cell space;
each said cells further comprising:
a rigid upper portion defining an opening of each said cell and continuous rigid upper walls depending from the rigid upper portion;
a flexible lower portion defining flexible lower walls and a flexible base of each said cell;
the base formed parallel with said rigid upper perimeter;
a hinged section bordering and joining the rigid upper portion and the flexible lower portion;
the flexible lower portion being transitionable at the hined section and folded to telescope between a first position in which each of the cell spaces defines a first volume and a first height and a second position in which the cell spaces defines a second volume and a second height, the first volume being greater than the second volume and the first height being greater than the second height;
said flexible lower walls aligned with said rigid upper walls at said second position; and
said base aligned substantially parallel with said rigid upper perimeter at said second position.

2. The seed starting tray of claim 1, wherein:
each of the plurality of cells defines a rectangular shape.

3. The seed starting tray of claim 1, wherein:
the lower portion includes at least one drainage opening.

* * * * *